United States Patent
Schirmer et al.

(10) Patent No.: US 6,363,619 B1
(45) Date of Patent: Apr. 2, 2002

(54) METHOD AND DEVICE FOR ADJUSTING A DISTANCE SENSOR

(75) Inventors: Guenter Schirmer, Ingersheim; Dietrich Adolph, Albershausen; Klaus Winter, Schwieberdingen; Hermann Mayer, Vaihingen; Bernhard Lucas, Mundelsheim; Thomas Beez, Weinsberg; Hermann Winner, Karlsruhe; Herbert Olbrich, Rutesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,033

(22) PCT Filed: Dec. 3, 1997

(86) PCT No.: PCT/DE97/02828

§ 371 Date: Dec. 21, 1999

§ 102(e) Date: Dec. 21, 1999

(87) PCT Pub. No.: WO98/38691

PCT Pub. Date: Sep. 3, 1998

(30) Foreign Application Priority Data

Feb. 26, 1997 (DE) .......................................... 197 07 590

(51) Int. Cl.[7] ............................. G01B 5/25; G01B 11/27
(52) U.S. Cl. ........................................... 33/288; 33/600
(58) Field of Search .......................... 33/286, 288, 600; 356/3.01, 3.02, 3.03, 6

(56) References Cited

U.S. PATENT DOCUMENTS

| 3,130,633 A | * | 4/1964 | Räntsch | 33/286 |
|---|---|---|---|---|
| 3,555,285 A | | 1/1971 | Irving | |
| 4,123,143 A | * | 10/1978 | Yachin et al. | 33/286 |
| 4,578,870 A | * | 4/1986 | Cooke | 33/288 |
| 4,973,155 A | * | 11/1990 | Masuda | 33/286 |
| 5,044,744 A | | 9/1991 | Ogawa et al. | |
| 5,191,328 A | * | 3/1993 | Nelson | 33/286 |
| 5,283,956 A | * | 2/1994 | Collot et al. | 33/288 |
| 6,226,879 B1 | * | 5/2001 | Baird | 33/286 |

FOREIGN PATENT DOCUMENTS

| DE | 34 06 867 | 10/1984 |
|---|---|---|
| DE | 40 25 392 | 11/1991 |
| DE | 42 01 214 | 2/1993 |
| DE | 42 19 582 | 12/1993 |
| DE | 196 07 653 | 9/1997 |
| EP | 0 526 424 | 2/1993 |
| FR | 2 074 724 | 10/1971 |
| JP | 08 327722 | 12/1996 |
| JP | 09 015327 | 1/1997 |

* cited by examiner

*Primary Examiner*—G. Bradley Bennett
(74) *Attorney, Agent, or Firm*—Kenyon & Kenyon (57) ABSTRACT

The present invention relates to a method and an apparatus for adjusting the alignment of a beam characteristic of a distance sensor, in particular of a proximity radar for a motor vehicle. An apparatus for positioning a motor vehicle, preferably a headlight aiming device, is joined to the target object for the distance sensor. Also provided is a service unit with which measured values or data of the distance sensor can be read out. On the basis of at least one predefined criterion, the measured values or data are analyzed in such a way that necessary displacement directions of the distance sensor can be displayed by way of the service unit. Preferably the capability of the distance sensor to determine angular positions of detected target objects is utilized. Otherwise adjustment is performed to predefined reception levels.

18 Claims, 6 Drawing Sheets

METHOD AND DEVICE FOR ADJUSTING A DISTANCE SENSOR

FIELD OF THE INVENTION

The present invention relates to a method and an apparatus for adjusting the alignment of a beam characteristic of a distance sensor. In particular, the present invention relates to an adjustment of the alignment of a beam characteristic of a proximity radar that is mounted in or on a motor vehicle, for example in the context of an automatic speed regulation system or a collision detector. The present invention can be used for the adjustment of all distance sensors that are based on the transmission and reception of electromagnetic or other waves.

BACKGROUND INFORMATION

An apparatus for adjusting a directional antenna of a radar proximity warning device of a vehicle is described in German Patent No. 42 01 214. The apparatus described in this German patent provides that the directional antenna is joined to an adjustment headlight to form a rigid unit that is displaceably attached to the vehicle by way of a displacement board, and this unit is adjustable by aligning the optical axis of the cone of light of the adjustment headlight using a vehicle-related optical detection device. The adjustment accuracy of the radar proximity warning device thus depends on the accuracy with which the cone of light of the adjustment headlight is adjusted. The proximity warning radar is not itself directly used for the adjustment.

It is also known, as described in this German patent, to adjust radar proximity warning devices with the aid of a commercially available microwave measurement device that detects the ray bundle emitted by the directional antenna. Measurement devices of this kind are, however, expensive, complex, difficult to operate, and are not yet part of the normal equipment of a motor vehicle repair shop.

Japanese Patent Application No. 08-327722 describes an apparatus for an automatic adjustment of the optical axis of a radar beam on the longitudinal vehicle axis (i.e., a central line). A beam is emitted from a radar unit toward a detection element that is located at a predetermined position in front of the motor vehicle. The reflected beams are sensed by a detection unit. A control unit then controls the radar unit in such a way that the optical axis of the radar coincides with the longitudinal vehicle axis.

SUMMARY OF THE INVENTION

The present invention provides a method and an apparatus with which a distance sensor, in particular on a motor vehicle, can be adjusted with respect to a reference axis in a simple, economical, and precise manner. "Adjustment of a distance sensor" means in this context, more specifically, the adjustment of the alignment of the beam characteristic of the distance sensor.

The advantages of the present invention provides e.g., the fact that adjustment of the distance sensor is accomplished without special, expensive, and difficult-to-operate measurement devices, in particular without special microwave devices. The apparatus and the method according to the present invention are accordingly very robust and very easy to operate and perform. This also applies in particular to persons who do not have specific knowledge of microwaves or of the particular technology corresponding to a distance sensor that is being used. The apparatus according to the present invention can be manufactured with little outlay from apparatuses known in the motor vehicle sector, in particular from a headlight aiming device or an axle alignment stand. All that is necessary therewith is to attach a reflector that is suitable as a target object for the distance sensor. One advantage as compared to the apparatus described in German Patent No. 42 01 214 is that the adjustment accuracy of the distance sensor is determined by the resolution capability of the distance sensor itself, and not by a headlight that is completely independent of it. This ensures that the adjustment accuracy corresponds exactly and optimally to the particular distance sensor being used. A further advantage of the method according to the present invention is that a functional check of the distance sensor is performed simultaneously with the adjustment.

DETAILED DESCRIPTION

Figure 1:
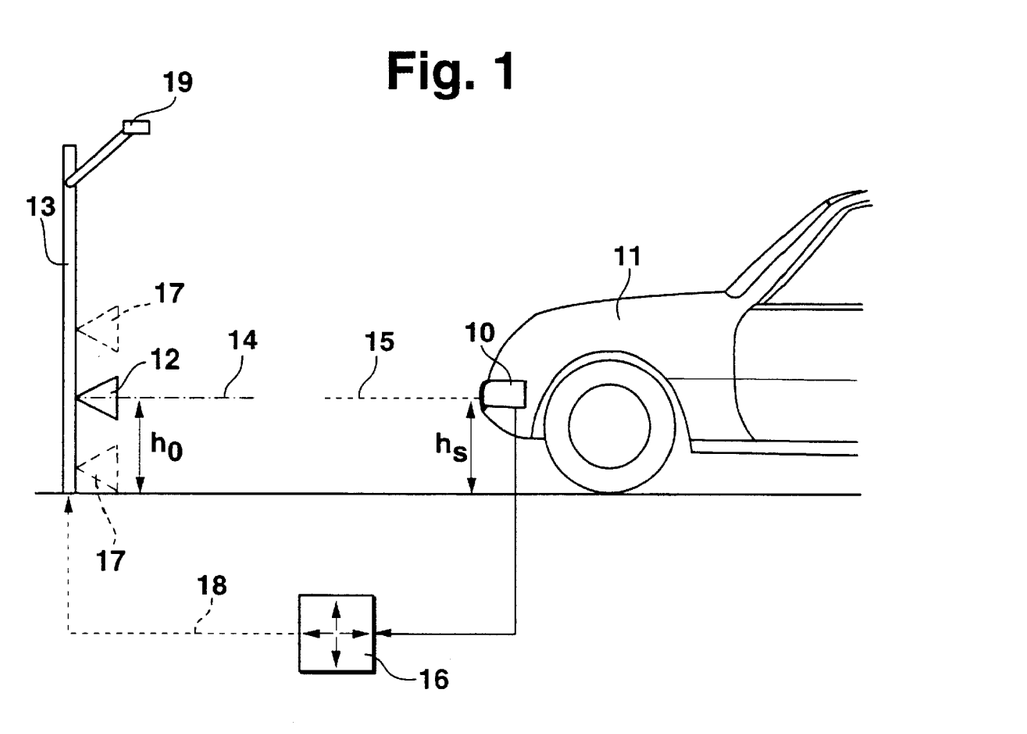
FIG. 1 shows a schematic diagram of an apparatus for performing a method according to the present invention.

FIG. 1 shows a distance sensor 10 to be adjusted, installed in the front of a motor vehicle 11. Distance sensor 10 may be provided for example, a proximity warning radar for collision avoidance or in the context of an adaptive vehicle speed regulation system. Distance sensor 10 is located at a height hS above the ground. Located opposite motor vehicle 11 in the beam direction of distance sensor 10 is a positioning apparatus 13 that will be described in further detail below. Attached to this positioning apparatus 13 is a target object 12 suitable for distance sensor 10, for example a triple reflector or corner reflector. In its starting position, target object 12 is located at a height hO above the ground, hO preferably being equal to hS. A dot-dash line 14 shows a normal direction of target object 12, for example an axis extending perpendicular to its effective reflection surface. A dashed line 15 indicates the principal beam direction of distance sensor 10. The number 16 designates a service unit which is connected via an interface to distance sensor 10, and with which, via that interface, measured values or data of distance sensor 10 can be read out. Service unit 16 also includes a display apparatus, for example in the form of four directional arrows, with which the direction of a necessary adjustment or displacement of distance sensor 10 can be displayed. The configuration of an external service unit 16 that can be coupled via an interface to distance sensor 10 corresponds to another embodiment of the present invention, but service unit 16 or at least parts thereof can also be integrated into distance sensor 10 itself. The number 17 designates two vertically shifted alternative positions of target object 12 that are needed for the adjustment process described later. A dashed line 18 indicates an optional connection between service unit 16 and positioning apparatus 13. By way of such a connection, service unit 16 can, for example, control the vertical or also a horizontal position of target object 12. The number 19 designates an alignment mirror with which positioning apparatus 13 can be aligned with respect to motor vehicle 11.

Figure 2A:
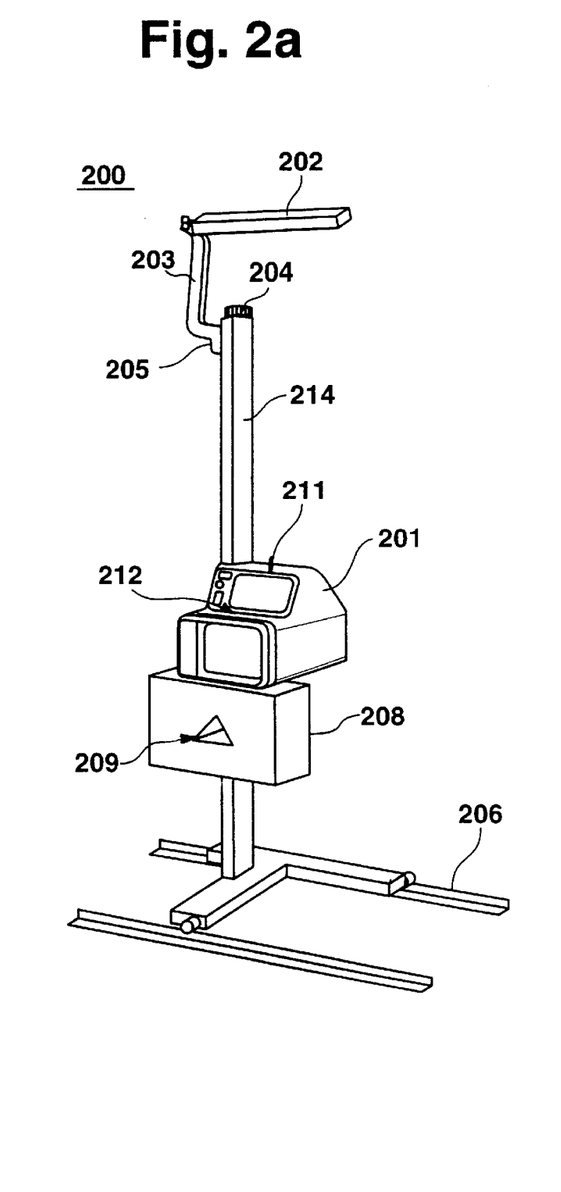
FIG. 2a shows a first exemplary embodiment of the apparatus according to the present invention.
Figure 2B:
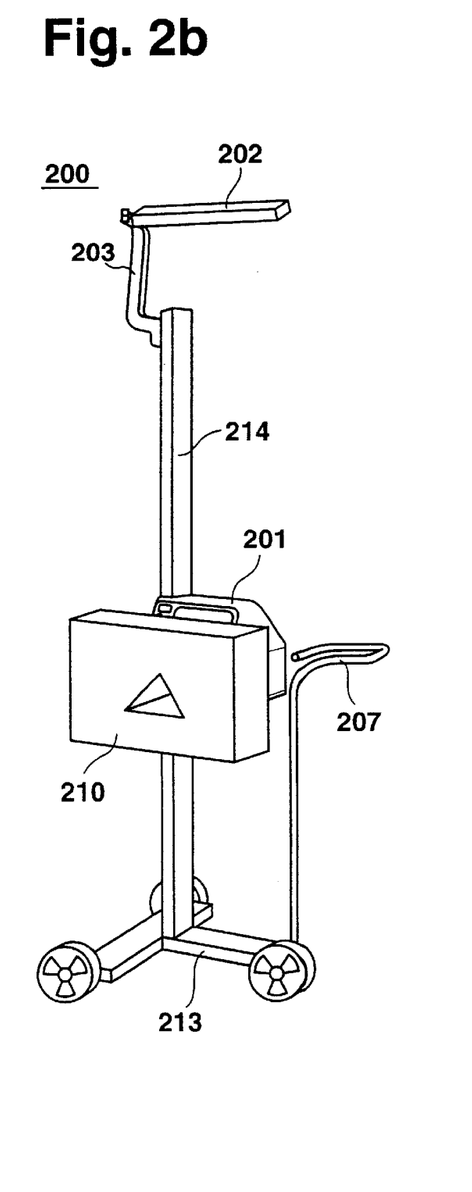
FIG. 2b shows a second exemplary embodiment of the apparatus according to the present invention.

FIGS. 2a and 2b show two exemplary embodiments, differing only in a few features, of an apparatus 200 according to the present invention. Respectively identical constituents of the apparatus are accordingly labeled with identical reference numbers. FIG. 2a shows a known headlight aiming device, model EFLE52 of the Bosch company. FIG. 2b shows a known headlight aiming device, model EFLE50/51 of the Bosch company. The two models differ primarily in terms of their stands 206 and 213. EFLE52 is mounted displaceably on a floor rail 206. It is a stationary headlight aiming device that is designed for a high throughput of vehicles. EFLE50/51, on the other hand, possesses a stand 213 that is movable on wheels. In both cases, apparatus 200 includes the actual headlight aiming device 201 which makes possible, based on known methods, the aiming or adjustment of a motor vehicle headlight. What is fundamentally necessary in this context is that device 201 be arranged parallel to the longitudinal vehicle axis in front of the respective motor vehicle headlight. For this purpose, device 201 is attached in adjustable-height fashion to a vertical support 214. An alignment mirror 202 is attached at the upper end of vertical support 214 via an extension arm 203. Alignment mirror 202 is described in further detail with reference to FIG. 3. As special features which result from the stationary stand 206, EFLE52 also possesses, as shown in FIG. 2a, a displacement capability 205 on extension arm 203 and a displacement capability 204 on vertical support 214. The purpose of these displacement capabilities is to bring apparatus 200, with the aid of alignment mirror 202, into a desired position with respect to a selectable reference line of a motor vehicle.

According to the present invention, apparatus 200 shown in FIG. 2a possesses a target object 208 below device 201. According to one embodiment, target object 208 is joined immovably to apparatus 200 or to device 201, and includes, for example, a triple reflector or corner reflector 209. A reflector of this kind is used in particular with high-frequency electromagnetic waves, and possesses the property of reflecting incident waves in the particular direction from which they came. FIG. 2b shows an alternative embodiment in which a target object 210, which corresponds to target object 208 on device 201, is put in place detachably. This corresponds to the use of the EFLE50/51 shown in FIG. 2b as a movable headlight aiming device. As a result of this use, the EFLE50/51 possesses a handle 207 with which it can be moved and thus positioned in front of a vehicle. The apparatus shown in FIG. 2a moreover has two direction-finding marks 211 and 212, explained in more detail below, that preferably constitute a sighting apparatus with notch and bead.

Figure 3:
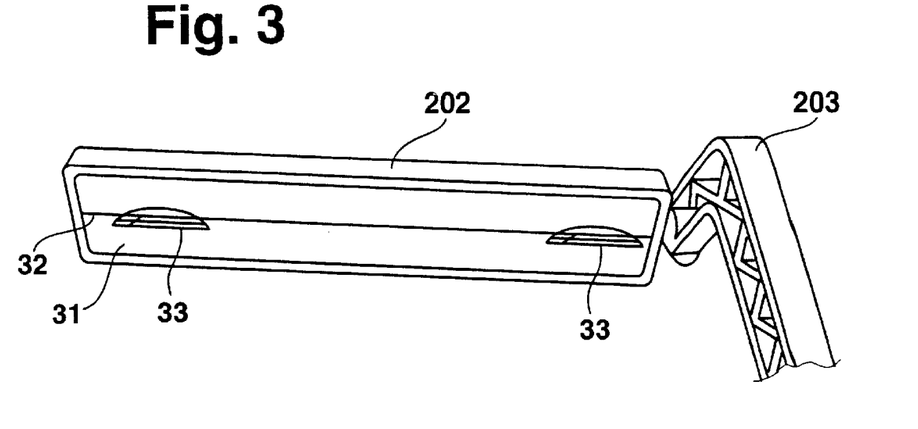
FIG. 3 shows an alignment mirror of the exemplary embodiments of the apparatuses illustrated in FIGS. 2a and 2b.

FIG. 3 shows, in a detailed depiction, alignment mirror 202 on extension arm 203. Alignment mirror 202 is mounted rotatably about its longitudinal axis parallel to a sighting line 32. Sighting line 32 is a visible straight line that is applied onto reflective surface 31. Alignment mirror 202 is set, above the operator's head, in such a way that two symmetrical reference points 33—for example the top edges of the headlights or the parting line of the hood—on the front of the vehicle are visible. Then the entire apparatus 200 is aligned in the longitudinal direction of the vehicle so that sighting line 32 uniformly touches the two outer reference points.

Apparatus 200 according to the present invention utilizes apparatus for positioning a measurement or testing device 201 and a motor vehicle relative to one another is supplemented with a target object 208, 210. Also suitable, of course, in addition to the EFLE5x described here as representatives of all headlight aiming devices, is any other apparatus with which a motor vehicle can be positioned perpendicular or parallel to a selectable reference line. For example, an apparatus 200 can be used for the purpose described here even without the actual headlight aiming device 201. Target object 208, 210 itself is then regarded as the measurement or test object. Also known are headlight aiming devices in which a motor vehicle can be clamped immovably into the corresponding device by way of adjustable or displaceable jaws. In this case as well, the motor vehicle is then located with its longitudinal axis at a known angle to a selectable reference line. An axle alignment stand, known per se, for motor vehicles can also be used to position the motor vehicle. As is evident, for example, from an instruction manual for an axle alignment device of the Bosch company having the publication number K7-UBF 192/5, 2nd edition, on page 20, bottom, in this case as well a motor vehicle can be positioned in such a way that it is at right angles to an optical center axis of the axle alignment device.

Figure 4:
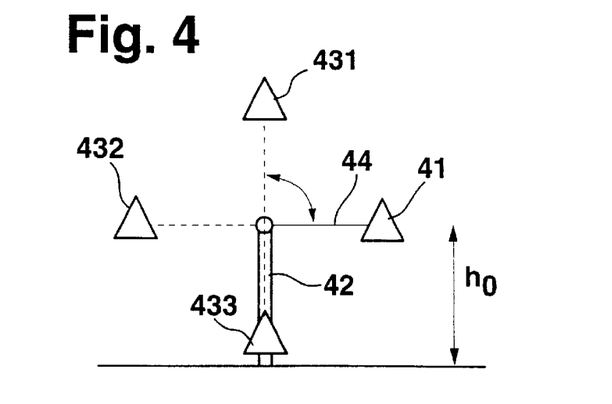
FIG. 4 shows an exemplary embodiment of a rotatably mounted target object.

FIG. 4 shows an exemplary embodiment of the present invention in which a target object 41 is attached, rotatably by way of an extension arm 44, on a holding apparatus 42. The numbers 431 through 433 designate alternative positions of target object 41. This embodiment provides a support (e.g., holding apparatus) 42 which is, for example, joined immovably to the positioning apparatus described above, this target object 41 can easily be moved into different positions that nevertheless are each known. This can be used in particularly advantageous fashion for the method described below for adjusting the distance sensor.

Figure 5:
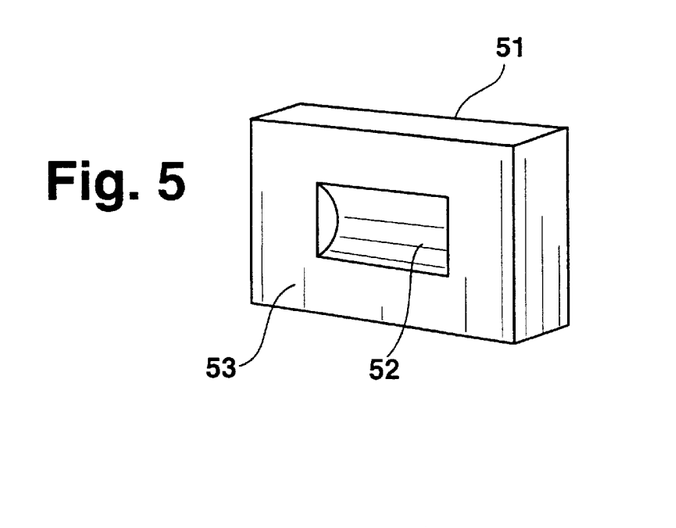
FIG. 5 shows the target object according to the present invention in a form of a reflector.

FIG. 5 shows a perspective depiction of how a target object 51 is constructed. It includes a reflector 52 that is suitable for reflecting the particular wave type of the distance sensor that is to be adjusted. According to an embodiment of the present invention, reflector 52 is surrounded by a material that absorbs incident waves. This ensures that spillover radiation of reflector 52 does not lead to disturbing and thus undesirable reflections from objects in the vicinity. Absorbing material 53 can be manufactured using any sufficiently known technology. For electromagnetic waves, for example, it can be made of graphite-containing foam. Any other material, or indeed any other design solution, that ensures that no undesired reflections can reach the distance sensor is, however, also of course suitable here. Reflector 52 can be configured, as shown in FIGS. 2a and 2b, as a corner reflector or triple reflector. A reflector of this kind possesses the property of reflecting incident waves in the particular direction from which they came. It is thus on the one hand outstandingly suitable for the intended purpose of adjusting a distance sensor. On the other hand, it possesses the disadvantage that it itself must be positioned very exactly with respect to the distance sensor. In addition, its reflection characteristic as a function of different angles of incidence—i.e. the curve $E(\phi)$ of the reflected signal energy $E$ as a function of the angle of incidence $\phi$—is relatively flat in the vicinity of the maximum. This results in difficulties that will be explained below in more detail, especially in adjusting a distance sensor that does not possess its own angle analysis system. These disadvantages are avoided with the use of a flat or planar reflector, for example a flat metal plate or, as shown in FIG. 5, a cylindrically curved concave reflector. With these two reflector, the maximum of the reflected signal energy E over different angles of incidence φ is more strongly and clearly evident. At the same time, they impose less stringent demands in terms of exact positioning of target object 51 in front of the distance sensor.

Figure 6:
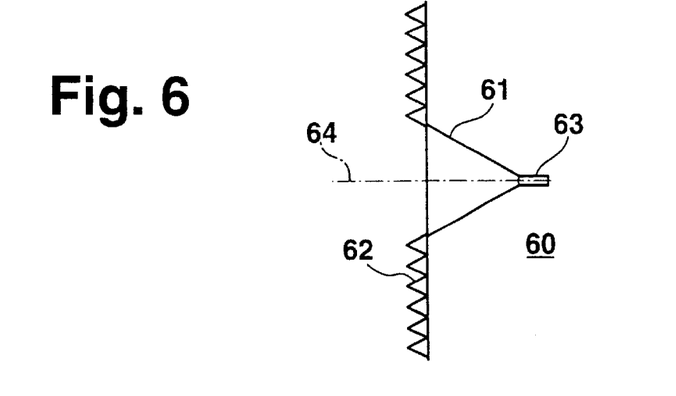
FIG. 6 shows a side view of the reflector according to the present invention.

FIG. 6 shows a target object 60 according to the present invention in a side view. Visible once again in this case is a triple reflector or corner reflector 61 that is surrounded by an absorbent material 62. According to an advantageous development of the invention, a laser source, for example a commercially available known laser pointer 63, is located at the rear vertex of reflector 61. A laser pointer 63 of this kind, advantageously integrated, makes possible or simplifies exact positioning of a target object 60 according to the present invention in front of the distance sensor that is to be adjusted. For example, target object 60 can be positioned particularly easily if the integrated laser pointer illuminates the distance sensor at the point at which the optical axis of the distance sensor is assumed to lie. In the case of a motor vehicle proximity radar, this is often the center point of a focusing antenna lens.

Figure 7:
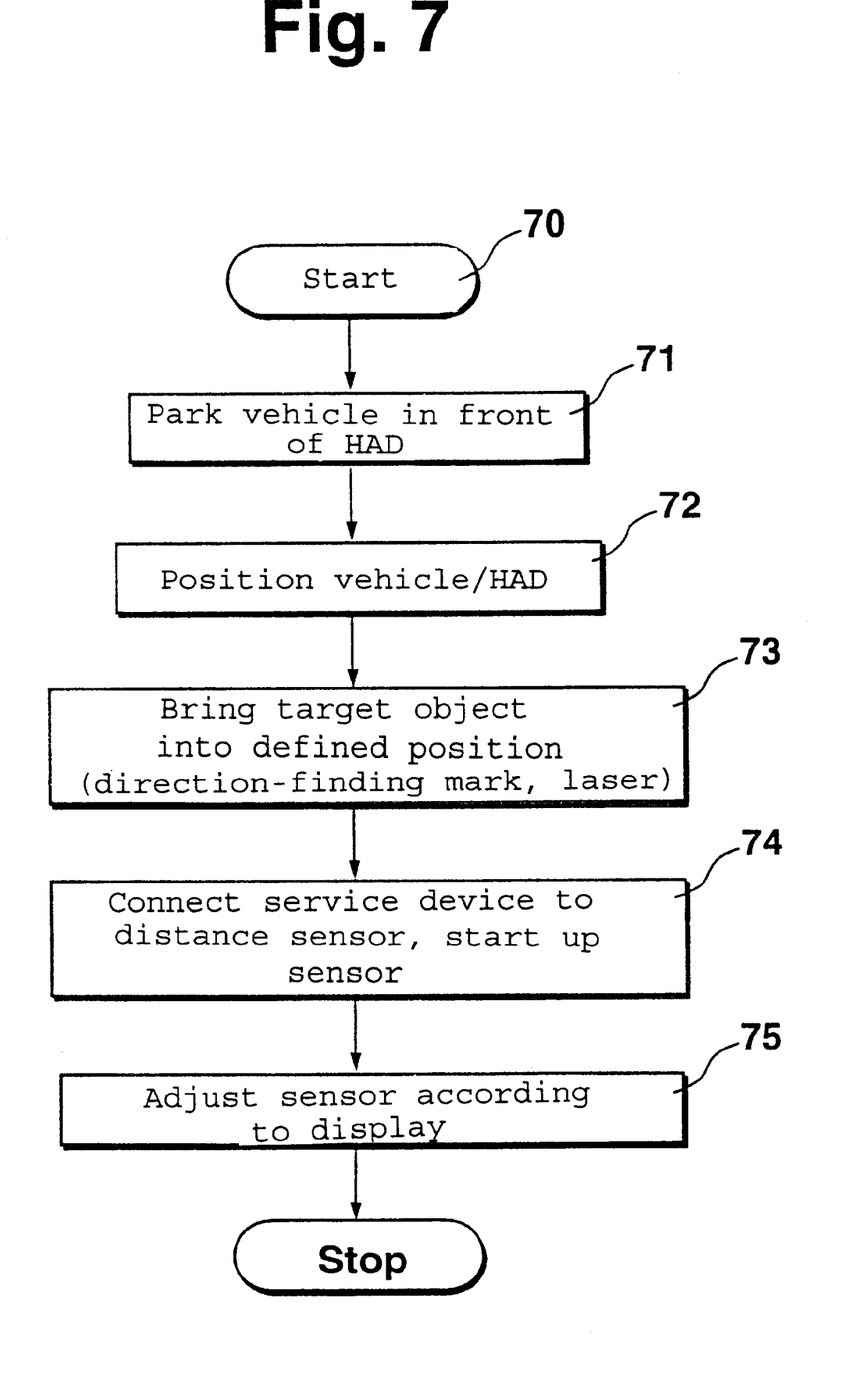
FIG. 7 shows a flow chart of the method according to the present invention.

FIG. 7 shows, with reference to an exemplary flow chart, how a distance sensor 10 installed in a motor vehicle 11 can be adjusted according to the method of the present invention. In first step 71, motor vehicle 11 having distance sensor 10 is parked in front of a positioning apparatus 13. This positioning apparatus is preferably a headlight aiming device (HAD) as shown in FIGS. 2a or 2b. As mentioned, however, it can also be any other positioning apparatus with which motor vehicle 11 can be brought with its longitudinal axis into a defined and known position. In the next step 72, the motor vehicle and/or the positioning apparatus, i.e. in this case the headlight aiming device, is exactly positioned with the aid of a particular arrangment, preferably alignment mirror 202. Subsequent thereto, the motor vehicle is located in a position such that normal direction 14 of target object 12 is at a known angle to a selected reference line 15, the longitudinal vehicle axis of motor vehicle 11 preferably being selected as such a line. Then, according to step 73, target object 12 is brought into a defined, in particular vertical position with respect to distance sensor 10. This is accomplished, in apparatus 200 as shown in FIGS. 2a and 2b, by way of a vertical and/or optionally also horizontal shift of the actual headlight aiming device 201. Target object 12 is thereby also shifted as desired in the horizontal and vertical direction. Direction-finding marks 211, 212 or laser pointer 63 as shown in FIG. 6 are preferably used for exact alignment of target object 12. In the case of a motor vehicle proximity radar having a dielectric lens for focusing electromagnetic waves, the laser beam of laser pointer 63 is, for example, aligned centerly on the dielectric lens. The same position should also be found when direction-finding marks 211, 212 are used. Then (step 74) distance sensor 10 is connected via a service interface to service unit 16, so that measured values or data of distance sensor 10 can be read out by way of service unit 16. Distance sensor 10 is then put into operation, i.e. it is used as intended to perform distance measurements, and, if possible and applicable, also direction or position measurements. In step 75, directions in which the distance sensor must be adjusted, i.e. displaced, in order to achieve optimum adjustment are then displayed via service unit 16. For this purpose, service unit 16 analyzes the measured values or data of distance sensor 10 on the basis of at least one predefined criterion (explained in more detail below).

Figure 8:
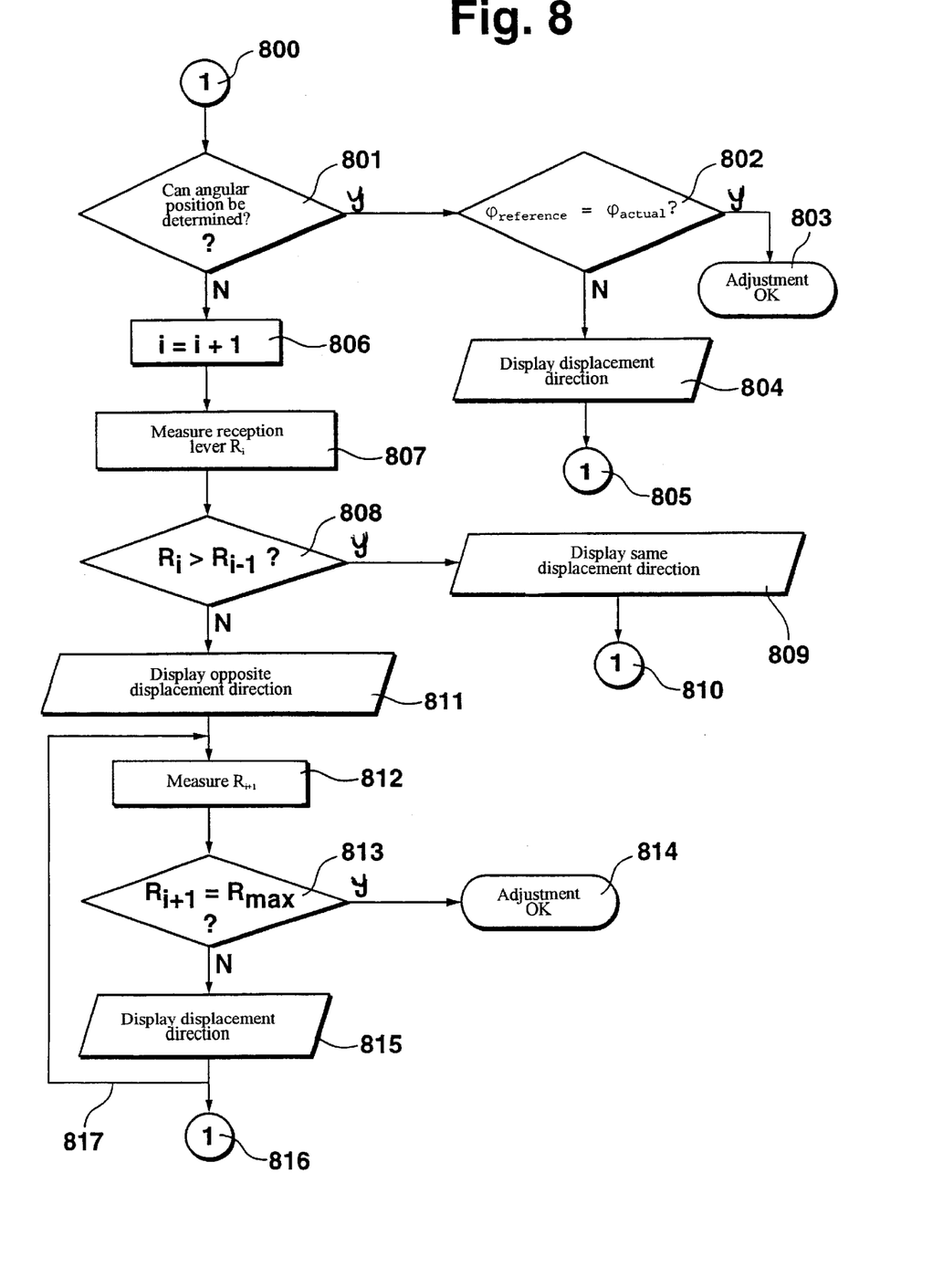
FIG. 8 shows a flow chart of a first portion of the method according to the present invention.

FIG. 8 shows a flow chart of a possible process sequence showing how the measured values or data of distance sensor 10 can be analyzed with the aid of service unit 16. The starting point of the method and at the same time the re-entry point for execution loops (explained in more detail above), is step 800. In a query 801, a distinction is first made as to whether or not distance sensor 10 has any angular resolution. If this question can be answered Yes, i.e. if distance sensor 10 possesses its own angular resolution or angular determination function, this capability is advantageously used to check the adjustment. In this case, in step 802, the angular position $\phi_{actual}$ of target object 12 determined by distance sensor 10 is compared to an angular position $\phi_{reference}$ that is obtained from the known position of motor vehicle 11 and of target object 12. If the reference and actual values for the angular position of target object 12 agree, then (step 803) the adjustment of distance sensor 10 is correct. This means that distance sensor 10 is adjusted with sufficient accuracy and correctness. If the reference and actual values of the angular positions do not agree, the direction of a necessary displacement of the distance sensor is derived, for example, on the basis of the sign of a difference formed from the two values. In step 804, the necessary displacement direction is accordingly displayed by service unit 16. The procedure then jumps back to starting point 800 and another measurement and checking cycle occurs. This loop is cycled through until the adjustment is correct (step 803). The prerequisite for performing this method is that (as defined in 801) distance sensor 10 itself possess the capability of determining the angular position of target object 12. A capability of this kind in the horizontal plane is often possessed, for example, by proximity warning radars for motor vehicles, so that when obstacles are detected it is possible to recognize whether they are located in the same lane as motor vehicle 11 or a different lane. In the vertical direction, however, proximity warning radars of this kind generally do not possess any angular resolution capability. The method described above is accordingly not suitable for vertical adjustment of a distance sensor 10 of this kind.

In this situation—i.e. if distance sensor 10 does not possess the capability to determine the angular position of a target object 12—the method described here branches first to step 806, in which a run variable i is incremented by 1. According to a preferred embodiment of the present invention, in step 807 a reception level $R_i$ of the wave received by distance sensor 10 and previously reflected from target object 12 is measured. This measurement is accomplished, according to a preferred embodiment of the present invention, by distance sensor 10 itself. If the latter does not, however, possess the capability of determining the reception level $R_i$, this can be performed, for example, by a suitable service unit 16. In step 808, the detected reception level $R_i$ is compared to the reception level $R_{i-1}$ of the respective previous measurement cycle. If the reception level of the current measurement cycle $R_i$ is higher than that of the previous measurement cycle $R_{i-1}$, service unit 16 signals (809) that the distance sensor must continue to be displaced in the same direction. The method then branches again (810) to starting point 800, and another measurement cycle begins. In this, run variable i is once again incremented by 1 (step 806), the next (and now current) reception level $R_i$ is determined, and this reception level $R_i$ is compared to what is now the previous reception level $R_{i-1}$. If the reception level of the current measurement cycle $R_i$ is at any point in time lower than the reception level of the previous measurement cycle $R_{i-1}$, the method then branches to step 811, in which the opposite direction for adjustment of the distance sensor is displayed. In graphic terms, this means that distance sensor 10 has been displaced beyond its optimum adjusted position, so that it now must be adjusted back. At the same time, the maximum possible reception level $R_{max}$ is also thereby known. In step 812, another reception level $R_{i+1}$ is once again measured, and this is compared (step 813) to the maximum possible reception level $R_{max}$, that is now known. If the two are identical, then according to step 814 the adjustment of distance sensor 10 is also correct. If the current reception level $R_{i+1}$ is not yet equal to the maximum possible reception level $R_{max}$, then the most recently selected displacement direction of the distance sensor continues to be displayed. The method then branches via step 816 to starting point 800. Alternatively, the branching can also occur to step 812. This last loop is then cycled through until the adjustment is found to be correct in step 814.

As is evident from the description above, the adjustment occurs here in the horizontal and the vertical direction, successively and independently of one another. A distance sensor that is to be adjusted thus advantageously has horizontal and vertical displacement means that can be set independently of one another. This can be implemented, for example, in the form of a three-point mount comparable to that of a known headlight mount.

If a distance sensor 10 possesses the capability of detecting the angular position of a target object 12 in both planes, the adjustment can also be accomplished in a combined process sequence, provided the other prerequisites—for example, mechanical displaceability—also exist. On the other hand, if a distance sensor 10 does not possess the capability of determining the angular position of a target object 12 in either the horizontal or in the vertical plane, then, for example, a method according to steps 806 through 817 must be executed for both planes.

Figure 9:
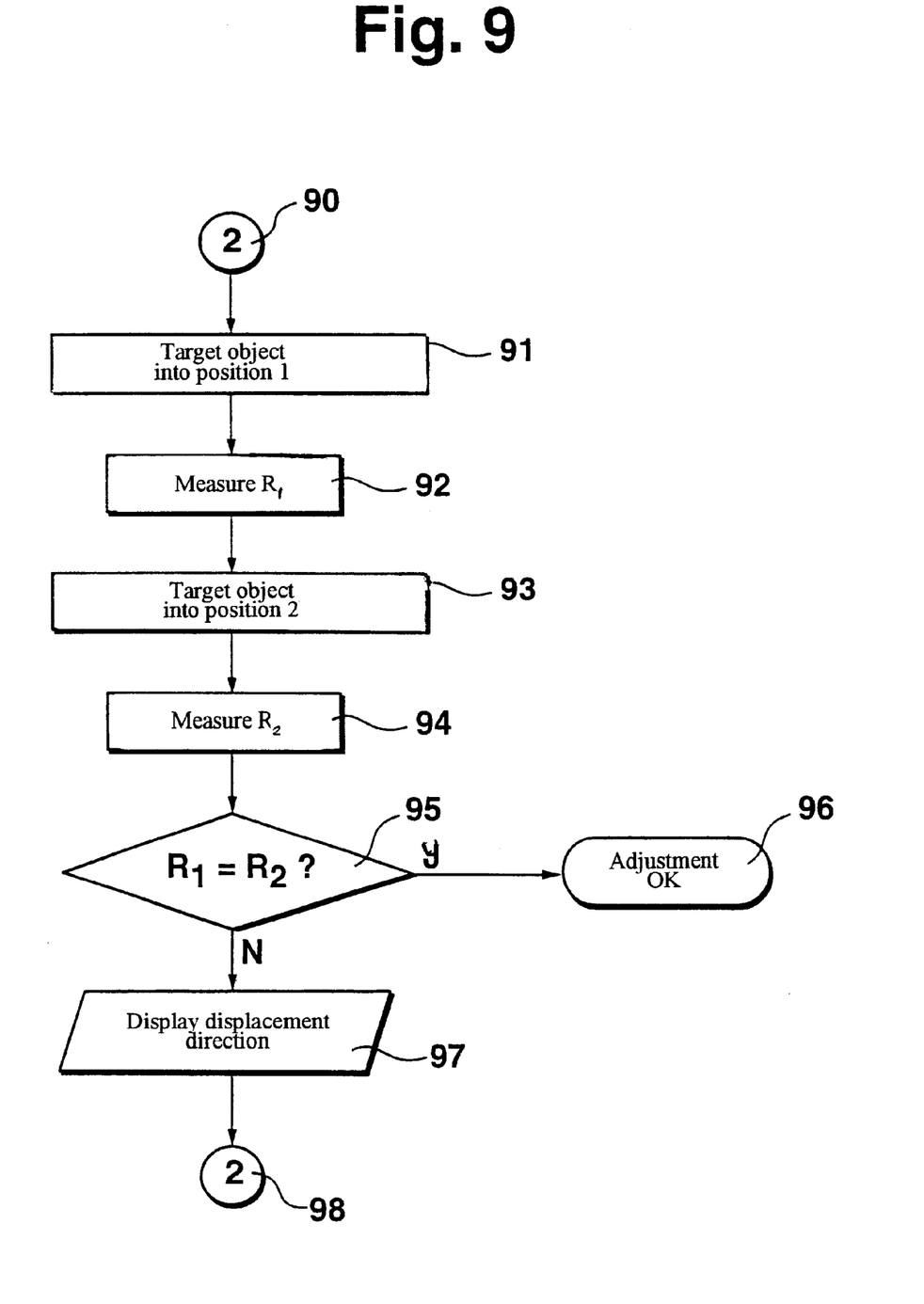
FIG. 9 shows a flow chart of a second portion of the method according to the present invention.

In steps 806 through 817 as shown in FIG. 8, a distance sensor 10 is adjusted to a maximum possible reception level $R_i$. Reflectors that generate a pronounced maximum in the reflected signal over different angles of incidence $\phi$ are particularly suitable for this embodiment of the method. This condition is met, in particular, by plane or cylindrically curved concave reflectors as shown in FIG. 5. When a corner reflector or triple reflector is used, on the other hand, the curve for the reception level in the region of the maximum is relatively flat. This makes exact adjustment difficult in this situation. It is also advantageous in this case, i.e. when a triple reflector or corner reflector of this kind is used, to adjust not to maximum reception levels but rather to clearly evident symmetry points in the reception characteristic of distance sensor 10. For example, it is possible to use for this purpose the points at which the reception level has decreased by 3 dB or by 6 dB from the maximum. A method based thereon is depicted in FIG. 9.

In step 91, target object 2 is first brought into a position 1. It is particularly advantageous in this context to use an apparatus as shown in FIG. 4, in which target object 41 can be rotated into various defined positions 43. For a vertical adjustment of distance sensor 10, for example, target object 41 is first brought into position 431. Then (step 92) a reception level $R_1$ is measured. In the next step, which is preferably once again displayed by way of service unit 16, target object 2 is brought into a second position, for example position 433. A reception level $R_2$ is then measured in step 94. This is followed by a query (step 95) as to whether reception level $R_1$ is identical to reception level $R_2$. If so, then the adjustment is correct (step 96). Otherwise (step 97) the necessary displacement direction of distance sensor 10 is displayed. This is obtained once again, for example, on the basis of the sign of the difference between $R_1$ and $R_2$. The method is then once again repeated in a loop until the adjustment is correct (step 96). The method accordingly jumps once again (step 98) to the beginning 90. Using positions 41 and 432 as shown in FIG. 4, this method can also be used for horizontal adjustment of a distance sensor 10. As an alternative to an apparatus as shown in FIG. 4 and in accordance with an embodiment of the present invention, a plane or cylindrically curved concave reflector, mounted so as to tilt in the plane that is to be adjusted, is also used for this method according to FIG. 9. In this case as well, an adjustment is correct when the reception levels $R_1$ and $R_2$ obtained when the reflector is tilted backward or forward are identical.

What is claimed is:

1. A method for adjusting an alignment of a beam characteristic of a distance sensor, comprising the steps of:

using a positioning apparatus, positioning at least one of a motor vehicle and a target object at a particular location to arrange a normal direction of the target object at a predetermined angle to one of a selected reference axis of the motor vehicle and a reference line of the motor vehicle, the target object being designed as a reflector and a reference target for the distance sensor, wherein the target object is coupled to the positioning apparatus which is one of a headlight aiming device and an axle alignment stand for the motor vehicle;

utilizing a service unit which is used for outputting particular data of the distance sensor and displaying a particular direction, the particular direction being one of a displacement direction and an adjustment direction, wherein the particular direction is determined as a function of the particular data of the distance sensor and at least one predetermined analysis criterion;

initiating the distance sensor; and displacing the alignment of the beam characteristic of the distance sensor in the particular direction.

2. The method according to claim 1, further comprising the step of:

determining one of a direction of the target object and an angular position of the target object using the distance sensor, wherein the at least one predetermined analysis criterion is provided as a function of a comparison between a predetermined position of the target object and the angular position of the target object.

3. The method according to claim 1, wherein the at least one predetermined analysis criterion is determined as a function of a determination that a reception level at the distance sensor is assigned a maximum predetermined value.

4. The method according to claim 1, wherein the at least one predetermined analysis criterion is determined as a function of a determination that two reception levels at the distance sensor are approximately identical, the two reception levels being measured when the target object is illuminated by the distance sensor in two symmetrical positions.

5. The method according to claim 2, further comprising the step of:

symmetrically displacing a position of the target object with respect to a starting position of the target object for obtaining the two symmetrical positions.

6. The method according to claim 1, further comprising the steps of:

monitoring a position of the target object with respect to the distance sensor using one of a direction-finding arrangement and a laser source; and setting the position of the target object by parallel shifting the target object.

7. The method according to claim 1, wherein the distance sensor includes a proximity radar which is mounted in the motor vehicle or on the motor vehicle.

8. The method according to claim 1, wherein the utilizing step includes the substep of initiating the service unit.

9. An apparatus for adjusting an alignment of a beam characteristic of a distance sensor, comprising:

a positioning apparatus which is designed for positioning one of a motor vehicle and a target object to arrange a normal direction of the target object at a predetermined angle to one of a selected reference axis of the motor vehicle and a reference line of the motor vehicle, wherein:

the target object is designed as a reflector and a reference target for the distance sensor, the target object is one of joined to the positioning apparatus and mounted on the positioning apparatus, and the positioning apparatus includes one of a headlight aiming device and an axle alignment stand for the motor vehicle.

10. The apparatus according to claim 9, wherein a position and a location of the target object are displaceable.

11. The apparatus according to claim 10, wherein the positioning apparatus includes one of a direction-finding arrangement and a laser source, the positioning apparatus being capable of situating the target object in a predetermined position with respect to the distance sensor.

12. The apparatus according to claim 10, wherein the positioning apparatus include a rotatably mounted extension arm which is attached to the target object.

13. The apparatus according to claim 10, wherein the target object includes a vertical tilt for displaceably mounting the target object.

14. The apparatus according to claim 9, wherein the reflector is a particular reflector designed for reflecting electromagnetic waves, the particular reflector being configured as one of a triple reflector, a corner reflector, a cylindrically curved reflector and a plane mirror.

15. The apparatus according to claim 14, wherein the particular reflector is surrounded by a material which absorbs incident electromagnetic waves.

16. The apparatus according to claim 14, further comprising:

a displacement arrangement arranged on the distance sensor, the displacement arrangement being capable of displacing the alignment of the beam characteristic of the distance sensor in two planes which are independent of one another; and a further arrangement including a service unit, the further arrangement being capable of outputting data provided by the distance sensor via the service unit.

17. The apparatus according to claim 9, wherein the distance sensor includes a proximity radar which is mounted one of in the motor vehicle and on the motor vehicle.

18. A distance sensor, comprising:

a displacement arrangement being capable of displacing an alignment of a beam characteristic of the distance sensor in two planes which are independent of one another; and a further arrangement including a service unit, the further arrangement being capable of outputting data provided by the distance sensor via the service unit, wherein the distance sensor receives particular data, the particular data being one of:

an angular position of a detected target object, and a reception level of electromagnetic waves which have been reflected from the target object and received again by the distance sensor.

* * * * *

UNITED STATES PATENT AND TRADEMARK OFFICE
CERTIFICATE OF CORRECTION

PATENT NO.    : 6,363,619 B1              Page 1 of 1
DATED         : April 2, 2002
INVENTOR(S)   : Schirmer et al.

It is certified that error appears in the above-identified patent and that said Letters Patent is hereby corrected as shown below:

<u>Title page,</u>
Item [57], change "The present invention relates to a" to -- A --
change "apparatus for" to -- apparatus are provided for --

<u>Column 2,</u>
Line 44, change "provided for" to -- provided, for --

<u>Column 4,</u>
Line 8, change "is" to -- which can be --
Line 36, change "this" to -- thus --

<u>Column 5,</u>
Line 5, change "reflector" to -- reflectors --

Signed and Sealed this

Twenty-fourth Day of June, 2003

JAMES E. ROGAN
*Director of the United States Patent and Trademark Office*